(12) United States Patent
Rafalskyi et al.

(10) Patent No.: US 11,993,401 B2
(45) Date of Patent: May 28, 2024

(54) COLD GAS THRUSTER WITH SOLID PROPELLANT

(71) Applicant: THRUSTME, Paris (FR)

(72) Inventors: Dmytro Rafalskyi, Orsay (FR); Javier Martinez Martinez, Paris (FR); Elena Zorzoli Rossi, Orsay (FR)

(73) Assignee: THRUSTME, Paris (FR)

( * ) Notice: Subject to any disclaimer, the term of this patent is extended or adjusted under 35 U.S.C. 154(b) by 0 days.

(21) Appl. No.: 17/781,936

(22) PCT Filed: Dec. 3, 2020

(86) PCT No.: PCT/EP2020/084479
§ 371 (c)(1),
(2) Date: Jun. 2, 2022

(87) PCT Pub. No.: WO2021/110841
PCT Pub. Date: Jun. 10, 2021

(65) Prior Publication Data
US 2023/0002085 A1     Jan. 5, 2023

(30) Foreign Application Priority Data

Dec. 3, 2019 (EP) .................................. 19306560

(51) Int. Cl.
*B64G 1/26* (2006.01)
*B64G 1/40* (2006.01)
*F02K 9/34* (2006.01)

(52) U.S. Cl.
CPC ............... *B64G 1/402* (2013.01); *B64G 1/26* (2013.01); *B64G 1/403* (2013.01); *F02K 9/343* (2013.01)

(58) Field of Classification Search
CPC . B64G 1/24; B64G 1/26; B64G 1/402; B64G 1/403
See application file for complete search history.

(56) References Cited

U.S. PATENT DOCUMENTS 3,201,973 A * 8/1965 Fitzgerald ............ G01N 33/222
102/374
3,373,563 A    3/1968 Mccabe
(Continued)

FOREIGN PATENT DOCUMENTS

CN    107939549 A    4/2018
EP    3 133 283    2/2017
(Continued)

OTHER PUBLICATIONS

International Search Report for PCT/EP2020/084479 dated Jan. 28, 2021, 4 pages.
(Continued)

*Primary Examiner* — Gerald L Sung
(74) *Attorney, Agent, or Firm* — NIXON & VANDERHYE

(57) ABSTRACT

Disclosed is a space cold gas thruster operating with a solid propellant. The cold gas thruster includes a tank suitable for containing a solid propellant and a tank heating device suitable for sublimating the solid propellant and forming gaseous propellant, the tank having an aperture for transferring the gaseous propellant outside the tank, such as a nozzle. Also disclosed is a process for determining the amount of remaining propellant in the propellant tank of the disclosed cold gas thruster.

1 Claim, 4 Drawing Sheets

(56) References Cited

U.S. PATENT DOCUMENTS

| | | | |
|---|---|---|---|
| 3,471,106 A | * | 10/1969 | Maes ............... B64G 1/403 |
| | | | 60/229 |
| 4,148,675 A | | 4/1979 | Ratte et al. |
| 4,755,677 A | | 7/1988 | Blincow et al. |
| 8,620,603 B1 | | 12/2013 | Hicks et al. |
| 10,399,708 B1 | | 9/2019 | Polzin et al. |
| 2009/0178415 A1 | | 7/2009 | Kretschmer |
| 2009/0223203 A1 | | 9/2009 | Yamamoto et al. |
| 2013/0048097 A1 | | 2/2013 | Mungas |
| 2019/0277224 A1 | | 9/2019 | Boelitz et al. |

FOREIGN PATENT DOCUMENTS

| | | |
|---|---|---|
| ES | 2 342 520 | 7/2010 |
| JP | S5279114 A | 7/1977 |
| JP | 2009214695 A | 9/2009 |

OTHER PUBLICATIONS

Written Opinion of the ISA for PCT/EP2020/084479 dated Jan. 28, 2021, 7 pages.

M.C.A.M. van der list et al., "Applications for Solid Propellant Cool Gas Generator Technology", Proc. '4$^{th}$ Int. Spacecraft Propulsion Conference', Jun. 2-4, 2004, 8 pages.

M.S. Rhee et al., "Highlights of Nanosatellite Propulsion Development Program at NASA-Goddard Space Flight Center", 14$^{th}$ Annual/ USU Conference on Small Satellites, Aug. 21-24, 2000, 11 pages.

\* cited by examiner

COLD GAS THRUSTER WITH SOLID PROPELLANT

CROSS-REFERENCE RELATED TO PRIOR APPLICATIONS

This application is the U.S. national phase of International Application No. PCT/EP2020/084479 filed Dec. 3, 2020 which designated the U.S. and claims priority to EP 19306560.4 filed Dec. 3, 2019, the entire contents of each of which are hereby incorporated by reference.

BACKGROUND OF THE INVENTION

Field of the Invention

The invention relates to a space cold gas thruster operating with a solid propellant.

More precisely the invention relates to a cold gas solid propellant thruster overcoming several problems of prior art cold gas thrusters, and to a process for measuring the amount of remaining propellant in the propellant tank of a solid propellant cold gas thruster.

More particularly, the invention can have application for small satellites. Typically, the invention will have an application for satellites having a weight between 1 kg and 100 kg, optionally able to range up to 500 kg. A particularly interesting case of application relates to the "CubeSat" of which a base module (U) weighs up to 1.3 kg and has dimensions of 10 cm*10 cm*10 cm. The cold gas thruster according to the invention can in particular be integrated into a module 1U or a demi-module (½U) and used in stacks of several modules by 2 (2U), 3 (3U), 6 (6U), 12 (12U) or more.

Description of the Related Art

Cold gas thrusters, or cold gas propulsion systems for spacecrafts, are rocket engines which use the expansion of a pressurized gas to generate thrust. Cold gas thrusters are simple systems classically comprising a fuel tank, a regulating valve and a propelling nozzle. By comparison with traditional thrusters, they do not house any combustion and therefore have lower thrust and efficiency. They can be used for instance for orbital maintenance, maneuvering or attitude control.

Gas and liquid propellants are classically used in cold gas based propulsion systems for spacecrafts. Nevertheless, the use of liquid propellants or gas propellants which can become liquid in certain conditions triggers different constraints and challenges. Among them, one can cite for instance the storage of the propellant in a gaseous or liquid form, which requires high pressure for a gas phase storage, and can trigger technical problems such as propellant sloshing in the case of the propellant being stored as a liquid. For example, patent documents U.S. Pat. No. 8,620,603 and US 2019/277224 disclose methods and systems to determine an amount of remaining fluid in the tank of a propulsion system.

In order to overcome at least part of these storage issues, cold gas thrusters with a solid storage of the propellant have been envisioned. Van der List M. C. A. M., et al. "Applications for Solid Propellant Cool Gas Generator Technology", *Proc. of the* 4th Space Propulsion Conference, Sardinia, Italy, 2-9 Jun. 2004 and Rhee M S, Zakrzwski C M, Thomas M A, "Highlights of Nanosatellite Propulsion Development Program at NASA-Goddard Space Flight Center", Proceedings of the AIAA/USU Conference on small satellites, Logan, UT, Aug. 21-24, 2000 disclose for instance such cold gas thrusters. In these thrusters, the propellant is stored in a solid form and is converted to gas by a chemical reaction, for instance by ignition of solid propellant pellets. A high pressure (few bars) of the gaseous propellant is obtained through this chemical reaction. Such systems are not compatible with all solid propellants; especially they are not compatible with the use of iodine propellant. In addition, these thrusters should be able to sustain a high pressure (few bars) of gaseous propellant, which impacts on their manufacturing and design. Finally, the gas pressure obtained by the chemical reaction cannot be finely controlled.

Patent documents U.S. Pat. No. 3,373,563, U.S. Ser. No. 10/399,708 and EP 3133283 disclose thrusters based on sublimation by heating of a solid material.

It would be advantageous to provide a space cold gas thruster overcoming at least part of the storage issues of the liquid and gas propellant cold gas thrusters, which works without requesting high pressures and which allows fine tuning of the gas pressure.

In this context, the Applicant of the present invention has developed a cold gas solid propellant thruster resolving the above technical problems. To their knowledge, the present invention is the first disclosure of a cold gas thruster operating by sublimation of a solid propellant, such as iodine, to obtain thrust.

SUMMARY OF THE INVENTION

A first object of the invention is a cold gas thruster comprising a tank suitable for containing a solid propellant and a tank heating device suitable for sublimating said solid propellant and forming gaseous propellant, the tank having an aperture for transferring said gaseous propellant outside said tank, such as a nozzle.

The solid propellant cold gas thruster of the invention presents a number of advantages towards existing systems. First, the solid form of the propellant allows a much higher storage density than for any gas, thus releasing volume constraints when manufacturing the thruster. In addition, as the solid propellant sublimation produces a relatively low pressure, such as a pressure lower than 0.1 bar, the tank design and requirements are simpler and the qualifications for the launch get easier. Finally, not requiring a tank sustaining high pressure also allows reducing the tank price by a factor above 10. In addition, this solution allows qualifying the system for using it in very restricted missions, such as missions deployed from the international space station (ISS) or on small satellites launched as a secondary payload.

According to particular aspects, the cold gas thruster comprises means for measuring an amount of remaining solid propellant in the tank, said means comprising:

- at least one tank temperature sensor or, respectively, a shock generator and a displacement or acoustic sensor in contact with the tank, and
- an electronic control board adapted for measuring an enthalpy change of the tank depending on power provided to the tank heating device, or, respectively, for measuring a frequency response with the displacement or acoustic sensor.

Other non-limitative and advantageous features of the thruster according to the invention, which may be considered alone or in any technically possible combination, are the following:

The solid propellant is selected from the group consisting of iodine (I₂), bismuth (Bi), cesium (Ce), cadmium (Cd), tin (Sn), indium (In), gallium (Ga), germanium (Ge), lithium (Li), mercury (Hg), adamantane, ferrocene, arsenic, polyvinyl chloride, polyimide, and polytetrafluoroethylene, preferably the solid propellant is iodine (I₂). Iodine (I₂) is especially advantageous in that its sublimation happens with a modest heating, for instance heating at a temperature from 80° C. to 100° C. In addition, I₂ stores as a low pressure solid, thus the tank may be irregular in shape, confirming to available space. Finally, I₂ is relatively low-cost compared to some other propellants, such as the ones listed above.

The tank comprises one or a plurality of divisions, in particular a plurality of divisions, each division being suitable for storing at least part of said solid propellant. The divisions in the tank afford simultaneous limitation of bouncing of the stored solid propellant and precise control of the heat transfer to the propellant. Indeed, the separate divisions allow increasing the surface to volume ratio for the thermally controlled surfaces, such that thermal flow towards the propellant blocks which may have lost contact with a wall is reinforced. Actually, one of the challenges of the solid propellant storage consists in the fact that, with time, the propellant block might become fractured, and various fractions of propellant can bounce between the tank walls in micro-gravity conditions, similarly to the sloshing effect when using liquid propellant. This process can significantly affect ability of the spacecraft for altitude control and precise positioning, especially in the case when high precision pointing is required. Another undesired effect of the propellant fracturing is the loss of thermal contact between the propellant and the walls of the tank, which is undesired because in this solid propellant cold gas thruster the propellant is sublimated by the heat transfer. This loss of thermal contact can trigger an increase in the time to reach the steady state, and it can even be impossible to transfer enough heat power to the propellant to ensure sublimation at the given rate. The design of the tank according to this embodiment solves these issues.

At least one of the tank divisions is at least partially filled with a binder preventing separation of propellant fractions and/or their free motion in the tank, such as chemically inert fibers, preferably glass wool fibers.

The divisions are delimited by the outer wall and/or inner walls of the tank.

At least one of the walls—outer wall and/or inner walls of the tank—defining each division is in direct or indirect thermal contact with at least one tank heating device. "Direct thermal contact" is obtained when at least one tank heating device touches at least one of the walls defining the division. "Indirect thermal contact" is obtained when the tank heating device does not touch the walls defining the division, but a heat transfer is performed from the at least one tank heating device to the at least one wall defining the division through radiation.

The total surface area of the tank inner walls and of the inner side of the outer wall which can be in contact with the propellant is calculated by matching the thermal transfer to the propellant with the required sublimation power for sublimating the solid propellant. The surface area of the tank walls may thus be calculated according to the following formula:

$$A = \frac{(\text{flow} \times H_S)}{\sigma \varepsilon (T_t^4 - T_i^4)},$$

wherein A is the surface area of the thank walls, flow is the desired propellant flow, Hs is the sublimation heat of the solid propellant, $\sigma$ is the Stephan-Boltzmann constant, $\varepsilon$ is the emissivity, $T_t$ is the tank temperature and $T_i$ is the propellant temperature. Tank walls with such surface area allow optimization of the heat transfer by matching thermal transfer to the propellant with required sublimation power.

The cold gas thruster comprises at least one insert of a porous material arranged within the tank, forming the divisions.

The porous material is made of ceramics or metal, preferably alumina or tungsten.

The cold gas thruster further comprises a storage sealing system. The storage sealing system may be any system suitable for limiting or avoiding leakage of propellant vapors through the exhaust nozzle or other aperture prior to the thruster first use in space. Preferably, the storage sealing system comprises a protective film and an infrared emitter. The protective film is positioned in front of the aperture for transferring the gaseous propellant outside the tank, and the infrared emitter is suitable for sublimating at least part of the protective film. Actually, prior to its use in space, the propulsion system classically undergoes different stresses such as qualification campaign with thermal cycling including ambient pressure case, and/or storage in various environments and for unpredictable time. During these steps, leakage of the solid propellant vapors through the exhaust aperture, in particular the exhaust nozzle, may be observed. Leakage of the propellant may result in damages to the other systems, including spacecraft, ground and launch equipment, as well as personnel if the propellant is toxic and/or corrosive. The thruster according to this embodiment solves this issue.

The cold gas thruster further comprises an on-off valve for controlling the transfer of gaseous propellant outside the thruster.

The thruster further comprises an electronic control board, and the tank is fixed directly onto said electronic control board. Said direct fixation allows a high miniaturization of the cold gas thruster of the invention thanks to the weight and volume reduction of the tank due to the use of a solid propellant such as iodine, to be sublimated. High miniaturization of the thrusters is important especially for their use in miniaturized spacecrafts. Conversely, classical cold gas thrusters are based on relatively large spherical or similar shape high-pressure tanks, not allowing their direct fixation on the electronic board. If a heavy tank was fixed on a board it would probably break the board during vibrations and/or shock loads.

The tank has the shape of a column, wherein the area of the tank face on which the exhaust aperture is located is lower than the area of each orthogonal tank face. This feature contributes to increasing the compactness of the miniaturized thruster.

The tank does not comprise an outer mechanical frame. This feature also contributes to increasing the compactness of the miniaturized thruster.

The thruster comprises at least two tanks, which are preferably controlled independently from each other. This allows versatility of the control of the propulsion units of the cold gas thruster. For instance, thrust vectoring can be implemented this way.

The cold gas thruster comprises thermal isolation means, such as thermal insulated fixations to a mechanical frame.

The invention also relates to a process for operating a cold gas thruster according to the invention, comprising a step of sublimating the solid propellant comprised in the cold gas thruster tank. All the features described above for the cold gas thruster of the invention apply to the process for operating the cold gas thruster.

A second object of the invention is a process for measuring the amount of remaining propellant in the propellant tank of a solid propellant cold gas thruster, comprising the steps consisting of:
  (a) Pre-heating the tank at a temperature T1, wherein T1 is significantly higher than the expected temperature of the spacecraft environment,
  (b) Maintaining the tank at the temperature T1 for a time sufficient for the thermal inertia of the system to be compensated,
  (c) Heating the tank at a temperature T2, wherein T2>T1,
  (d) Calculating the enthalpy change during the heating from T1 to T2,
  (e) Comparing the obtained enthalpy value with the enthalpy values in a pre-established ΔH vs mass table, and
  (f) Determining the amount of remaining propellant in the propellant tank.

The process for measuring the amount of remaining propellant may further comprise a step (a1), preferably performed before step (a), consisting of:
  (a1) Establishing a table of ΔH for different masses of the propellant.

A third object of the invention is a process for determining the amount of remaining propellant in the propellant tank of a solid propellant cold gas thruster, comprising the steps consisting of:
  (a') Disposing a shock generator and a displacement or acoustic sensor in contact with the tank,
  (b') Generating a shock with the shock generator,
  (c') Measuring a frequency response with the displacement or acoustic sensor,
  (d') Comparing the obtained frequency response with the frequency values in a pre-established mass vs oscillation frequency response table, and
  (e') Determining the amount of remaining propellant in the propellant tank.

The process for measuring the amount of remaining propellant may further comprise a step (a1) preferably performed before step (a'), consisting of:
  (a'1) Establishing a mass vs oscillation frequency response table.

In specific embodiments, the processes for measuring the amount of remaining propellant in the propellant tank of a solid propellant cold gas thruster are for measuring the amount of remaining propellant in the propellant tank of a solid propellant cold gas thruster according to the invention.

The processes for measuring the amount of remaining propellant in a solid propellant cold gas thruster according to the invention are solutions to the well-known difficulty to assess the remaining amount of solid propellant in the propellant tank of the cold gas thruster when the thruster is in use in space.

Preferably, the method for measuring the remaining solid propellant inside the propellant tank, is based on:

measuring and calculating an enthalpy change during heating of the tank and comparing the enthalpy change with a pre-established enthalpy change versus mass table; or
  measuring a frequency response of the tank to a shock using a displacement or acoustic sensor and comparing the frequency response with a pre-established mass versus oscillation frequency response table.

The following description with reference to the accompanying drawings will make it clear what the invention consists of and how it can be achieved. The invention is not limited to the embodiments illustrated in the drawings. Accordingly, it should be understood that where features mentioned in the claims are followed by reference signs, such signs are included solely for the purpose of enhancing the intelligibility of the claims and are in no way limiting on the scope of the claims.

DESCRIPTION OF THE PREFERRED EMBODIMENTS

Cold Gas Thruster

Figure 1:
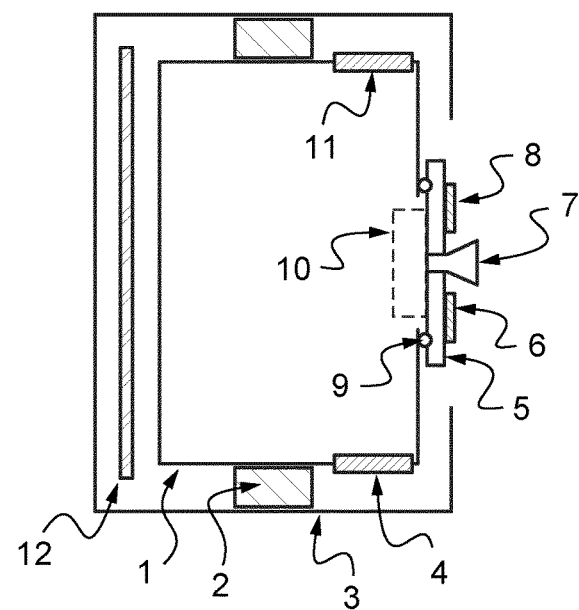
FIG. 1 is a schematic sectional view of a cold gas thruster according to the invention.

The cold gas thruster represented on FIG. 1 comprises a thermally insulated and thermally regulated propellant tank 1, connected to a thermally regulated nozzle 7. The tank is fixed inside a mechanical frame 3 via thermal insulated fixations 2.

The nozzle 7 can be shaped in a single aperture, but its profile may alternatively be optimized, for instance with a convergent-divergent profile. Such optimization allows increasing the exhaust velocity of up to a factor of 5 when compared to the single aperture.

The nozzle 7 may be replaced with any other type of aperture suitable for transferring the gaseous propellant outside the tank, also designated as exhaust aperture 7.

In some embodiments, the aperture 7 suitable for transferring the gaseous propellant outside the tank 1 is not thermally regulated.

In some embodiments, the mechanical frame 3 is absent from the thruster, especially when the thruster requires miniaturization.

The material of the tank 1 inner surface (also designated as inner side of the tank outer wall) can be any material which can resist corrosion due to the propellant gas, such as iodine. For instance, the tank 1 inner surface can be coated with a metal, such as for instance gold, molybdenum, tungsten or platinum, or a halogen resistant polymer such as for instance polytetrafluoroethylene, ethylene tetrafluoroethylene, perfluoroalkoxyalkane or fluorinated ethylene propylene.

Similarly, the material of the nozzle 7 inner surface can be any material which can resist corrosion due to the propellant gas, such as iodine, for instance the materials listed above for the inner surface of the tank 1.

The material of the tank 1 outer surface can be preferably a material having a low emissivity in the infrared range, for instance an emissivity lower than 0.2 in the infrared range, in order to minimize power losses during the operation.

In some embodiments, the gap between the tank 1 and the mechanical frame 3 is at least partially filled with an insulation material such as a multi-layer insulation material (MLI).

The cold gas thruster of FIG. 1 comprises at least one tank heater 4, and at least one tank temperature sensor 11.

The nozzle 7 is fixed on a nozzle support 5, and the nozzle 7 can be heated by at least one nozzle heater 6. The temperature of the nozzle 7 is monitored by at least one nozzle temperature sensor 8.

The tank heater 4 and/or nozzle heater 6 can be any device appropriate for raising the temperature respectively inside the tank 1 and/or the nozzle 7 to a desired value or range. Typical types of tank and/or nozzle heaters are electrical heaters and/or electromagnetic radiation sources, such as infrared emitters, LASERs and/or induction heaters.

Preferably, no fuel/oxidizer pair is present in the device, thus the propellant in the tank 1 cannot be ignited by the heat provided by the tank heater 4.

The cold gas thruster further comprises a sealing 9, an optional on/off valve 10 to allow or not the gas flow through the nozzle 7, such as described for instance in patent application FR1901159, and an electronic board 12 controlling the thruster.

The electronic board 12 controlling the cold gas thruster may be for instance a Printed Circuit Board (PCB).

The inside of the propellant tank 1 of the cold gas thruster may comprise at least two divisions 33, 37, each division being suitable for storing at least part of the solid propellant. The delimitation of the tank divisions 33, 37 may be of any material, number, size, relative position and/or shape appropriate for limiting bouncing of the stored solid propellant and/or limiting heat transfer problems.

Figure 2:
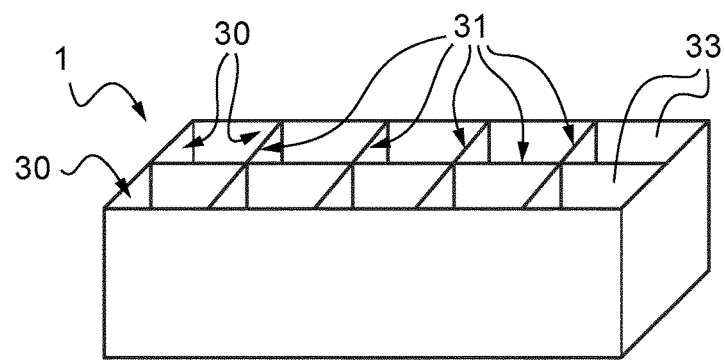
FIGS. 2 and 3 are schematic views of two different ways to implement the divisions inside the propellant tank. The divisions in FIG. 2 are delimited by thin walls with orthogonal positioning. The divisions in FIG. 3 are formed with a porous insertion.
Figure 3:
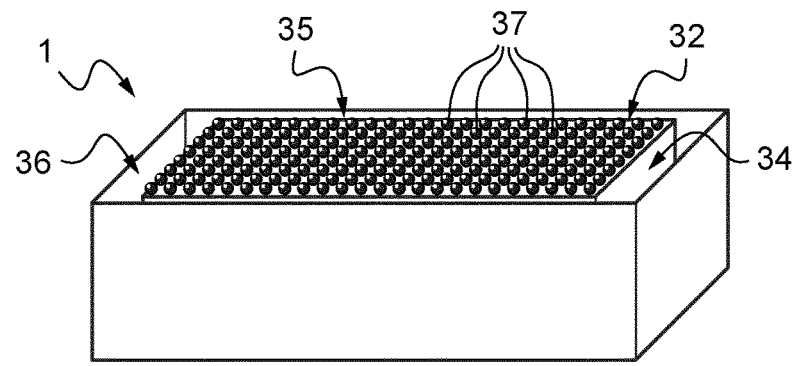

The delimitation of the divisions 33, 37 may for instance be made of walls, in particular an outer wall 30 and at least one inner wall 31, as shown on FIG. 2, or of at least one insertion of porous material 32, as shown on FIG. 3. FIGS. 2 and 3 present alternative sectional views of the tank 1. The lower wall of tank 1 as represented on FIGS. 2 and 3 corresponds to the left wall of tank 1 as represented on FIG. 1. In order to represent the inside of tank 1 on FIGS. 2 and 3, the right wall of tank 1, which comprises the exhaust aperture 7, as represented on FIG. 1, is absent from FIGS. 2 and 3.

Preferably, the delimitation of each division 33, 37 is in direct or indirect thermal contact with at least one tank heater 4.

The inside of the thruster tank 1 of FIG. 2 comprises multiple divisions 33 delimited by an outer wall 30 and inner walls 31, preferably thin walls. The inner walls 31 have an orthogonal positioning relative to each other and relative to the outer wall 30. Alternatively, they may be in any positioning allowing the filling of the divisions 33 with at least part of the solid propellant and allowing limiting bouncing of the stored solid propellant and/or limiting heat transfer problems, for instance honeycomb or arbitrary positioning. The inner walls 31 and/or outer wall 30, especially the inner side of the outer wall 30 which can be in contact with the propellant, may be independently made of any appropriate material. In an embodiment, the inner walls 31 and the outer wall 30, preferably the inner side of the outer wall 30, are made of the same material. Preferably, they are made of a non-porous material. The material of the inner walls 31 of the tank 1 can be any material which can resist corrosion due to the propellant gas, such as iodine. For instance, the tank inner walls 31 can be coated with a metal, such as for instance gold, molybdenum, tungsten or platinum, or a halogen resistant polymer such as for instance polytetrafluoroethylene, ethylene tetrafluoroethylene, perfluoroalkoxyalkane or fluorinated ethylene propylene.

The total surface area of the tank inner walls 31 and of the inner side of the outer wall 30 may be calculated by matching the thermal transfer to the propellant with the required sublimation power. Advantageously, the total surface area of the tank inner walls and of the inner side of the outer wall 30 is calculated according to the following formula:

$$A = \frac{(\text{flow} \times H_S)}{\sigma \varepsilon (T_t^4 - T_i^4)},$$

wherein A is the surface area of the tank walls, flow is the desired propellant flow, Hs is the sublimation heat of the solid propellant, $\sigma$ is the Stephan-Boltzmann constant, $\varepsilon$ is the emissivity, $T_t$ is the tank temperature and $T_i$ is the propellant temperature. Tank walls with such surface area allow optimization of the heat transfer.

Each division 33, 37 of the tank 1, especially when the divisions 33 are delimited by walls 30, 31, may be independently at least partially filled, preferably before the filling thereof with the melted propellant, with a binder preventing separation of propellant fractions and/or their free motion in the tank. Said binder can be made of chemically inert fibers, for instance glass wool fibers. In embodiments, the fibers are entangled and/or twisted with each other in the divisions 33. Preferably, the mean length of the fibers is greater than 10 nm, in particular the mean length of the fibers is greater than 20 nm. The volumetric amount of binder, preferably chemically inert fibers, in the divisions can be any amount appropriate for preventing separation of propellant fractions and/or their free motion in the tank. In embodiments, the volumetric amount of binder, preferably chemically inert fibers, in the divisions, ranges up to 5% of the propellant volume.

A gap exists between the divisions 33, 37 of the tank 1 and the wall of the tank 1 comprising the aperture 7, in order to allow the gaseous propellant to flow towards the aperture 7. Said gap may be at least partially filled with a binder preventing separation of propellant fractions and/or their free motion in the tank, such as chemically inert fibers, for instance glass wool fibers, as was detailed above for the divisions 33.

The inside of the thruster tank 1 of FIG. 3 comprises a porous insertion 32 delimiting the divisions 37. The porous insertion 32 is made of a porous material such as a metal or ceramics, comprising interconnected pores. Alternatively, the inside of the thruster tank 1 may comprise more than one porous insertion 32, each independently made of a similar or different porous material. By "porous material" is meant a material comprising at least two interconnected pores. The porosity of the porous material is higher than 70%, and the mean pore size ranges from 0.01 to 5 mm. Advantageously, the porous material presents both a high resistance to corrosion with propellant, such as iodine, and a high thermal conductivity. In an embodiment, the porous material is selected from the group consisting of highly porous $Al_2O_3$ ceramics and porous tungsten. The porous insertions provide homogeneous heat transfer to the propellant and prevent free motion of the propellant fractions larger than a pore size. In an embodiment, at least part of the edges of the porous insertions are closed, for instance by a binder preventing separation of propellant fractions and/or their free motion such as chemically inert fibers positioned in the insertions. This closing triggers complete prevention of the motion of even smaller fractions of the propellant towards the aperture 7 suitable for transferring the gaseous propellant outside the tank 1.

A gap exists between the at least one porous insertion 32 of the tank 1 and the wall of the tank 1 comprising the aperture 7, in order to allow the gaseous propellant to flow towards the exhaust aperture 7. Said gap may be at least partially filled with a binder preventing separation of propellant fractions and/or their free motion in the tank, such as chemically inert fibers, for instance glass wool fibers, as was detailed above for the divisions 33. The binder filling said gap also prevents motion of the at least one porous insertion 32 in the tank 1 after sublimation of the propellant.

Preferably, gaps 34, 35, 36 also independently exist between each side of the at least one porous insertion 32 and the corresponding outer wall 30 of the tank 1. This configuration allows minimizing constraints, and facilitating the propellant gas flow towards the exhaust aperture 7. As above, each of said gaps may be at least partially filled with a binder preventing separation of propellant fractions and/or their free motion in the tank, such as chemically inert fibers, for instance glass wool fibers.

Preferably, all binders used in the device to fill at least partially the divisions 33, 37 and/or gaps are the same binder, such as chemically inert fibers, for instance glass wool fibers, as defined above.

Figure 4:
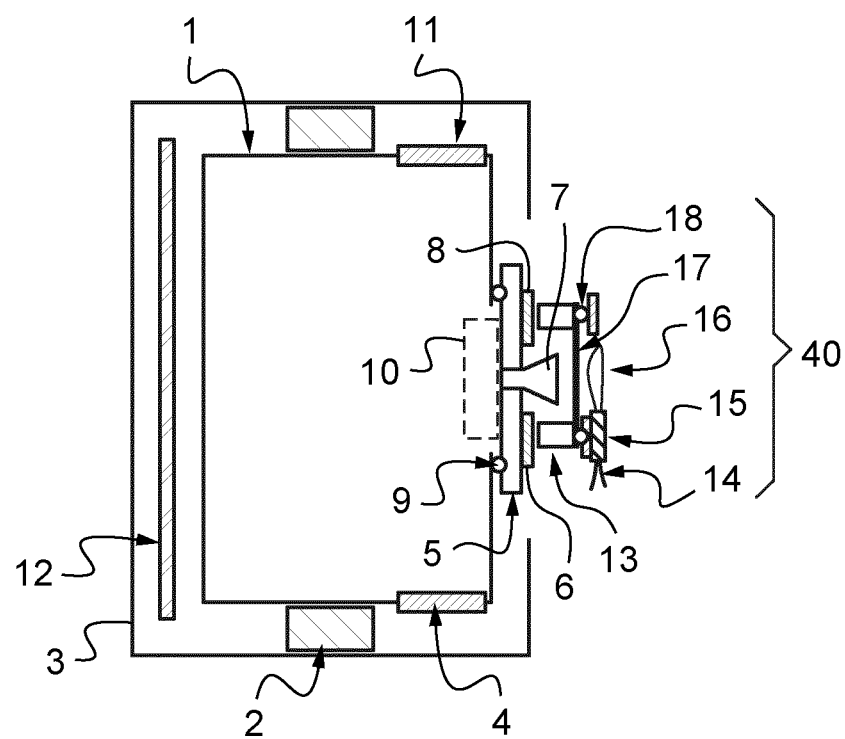
FIG. 4 is a schematic sectional view of a cold gas thruster according to the invention comprising a storage sealing system.

The thruster of FIG. 4 comprises, in addition to the elements of the thruster of FIG. 1, a storage sealing system 40. The storage sealing system 40 aims at minimizing the risk of propellant leakages and consequent damages to the other systems including spacecraft, ground, launch equipment and personnel, especially during the various stresses and storages prior to the use in space of the thruster. The storage sealing system 40 is mounted on top of the nozzle 7, and comprises a protective film 17 and an infrared emitter 16. The protective film 17 can be a polymer film, preferably a corrosion-resistant polymer film. The protective film 17 material can be for instance selected from the group consisting of polypropylene, polyimide and polytetrafluoroethylene. The protective film 17 comprises one layer, but it may alternatively comprise at least two layers, for instance two or three layers, each made of similar or different material, for redundancy. The protective film 17 is positioned in front of the nozzle 7 exit, and hermetically prevents leakage of propellant through the nozzle 7. The protective film 17 of the storage sealing system 40 of FIG. 4 is sealed around the nozzle 7, against the nozzle support 5 flange. If necessary, the thruster may comprise at least one extension for the system fixation 13. A sealing 18 is provided for the film against the nozzle support 5 or the extension 13. The infrared emitter 16 is formed by a loop of refractory metal wire, such as molybdenum or tungsten for instance. The infrared emitter 16 is positioned on top of the protective film 17, the loop of refractory metal wire being substantially parallel to the protective film 17. For instance, the infrared emitter 16 may be a loop of 1 cm diameter of a tungsten wire of 0.15 mm diameter. The gap between the infrared emitter 16 and the protective film 17 can be comprised between 1 mm and 5 mm. The infrared emitter 16 can be held by a holder 15. The infrared emitter 16 is suitable for sublimating at least part of the protective film 17, preferably the whole protective film 17. Electrical connections 14 are provided for supplying electrical power to the loop of refractory metal 16. The operating may be the following: at the first firing request, sufficient DC or AC power is supplied to the loop of refractory metal 16 to warm it above 2000° C., triggering sublimation of the protective film 17 in a few seconds due to local overheat. In the case of the infrared emitter 16 made of a loop of 1 cm diameter of a tungsten wire of 0.15 mm diameter, successful sublimation of a triple layer protective polypropylene film is obtained with 10 W of DC power, the corresponding DC current being approximately 3.5 A. The storage sealing system 40 comprising the protective film 17 and the infrared emitter 16 may be replaced with any other storage sealing system 40 allowing prevention of propellant leakages and which destruction, preferably by sublimation of at least part of the storage sealing system 40, may be triggered by a stimulus, such as the supply of an electrical DC or AC power and/or current.

The propulsion system comprising the cold gas thruster of the invention can be significantly miniaturized to be suitable for use on very small satellites and to add flexibility to the spacecraft design. The tank 1 can for instance have a columnar shape, and/or be used without the outer mechanical shell 3, and/or be fixed directly on the electronic board controlling the thruster 12. The miniaturized tank 1 may present any shape appropriate for minimizing the thruster volume, for instance taking into consideration the volume constraints of the spacecraft.

Figure 5:
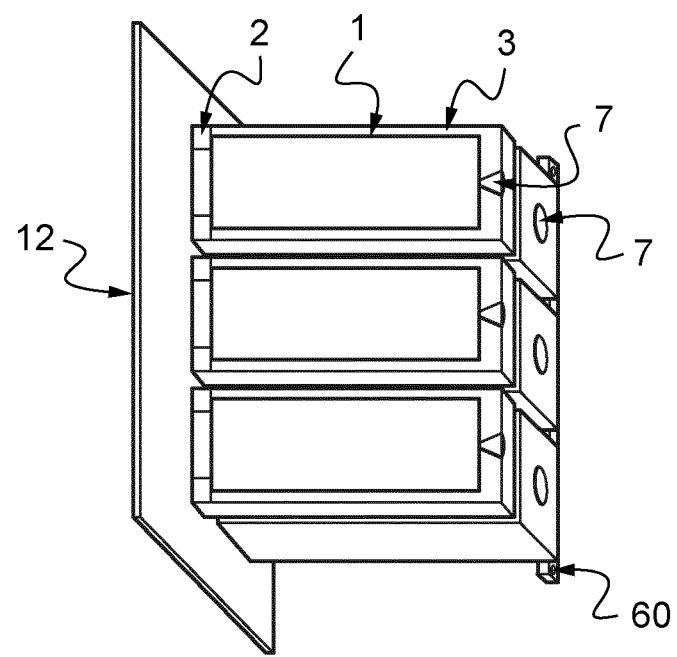
FIG. 5 is a sectional view of an array of thruster tanks as represented on FIG. 6.
Figure 6:
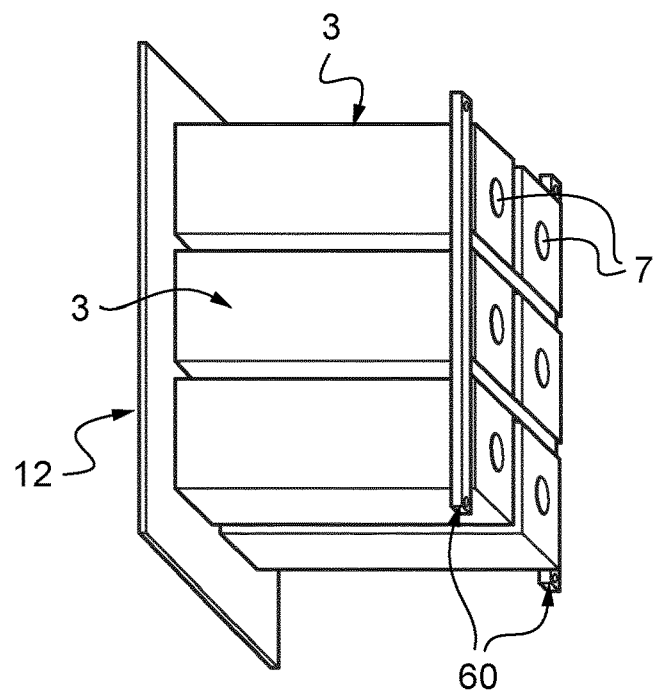
FIG. 6 is a schematic view of a device comprising an array of thruster tanks according to the invention, on a single control printed circuit board (PCB)

The invention also relates to clusters of propulsion units comprising, fixed on a single control board 12, a plurality of tanks 1, preferably miniaturized tanks 1. The plurality of miniaturized tanks 1 may be positioned within a support frame 60. The cluster of propulsion units of FIGS. 5 and 6 comprises six miniaturized tanks 1 as described in FIGS. 1 and 4, with a columnar shape, fixed on a single control board 12 and positioned within a support frame 60. In this embodiment, the board 12 is positioned out of the mechanical frame 3 in order to increase compactness. The separate control of the different units of the cluster can be used for thrust vectoring.

Thruster Operation

Figure 7:
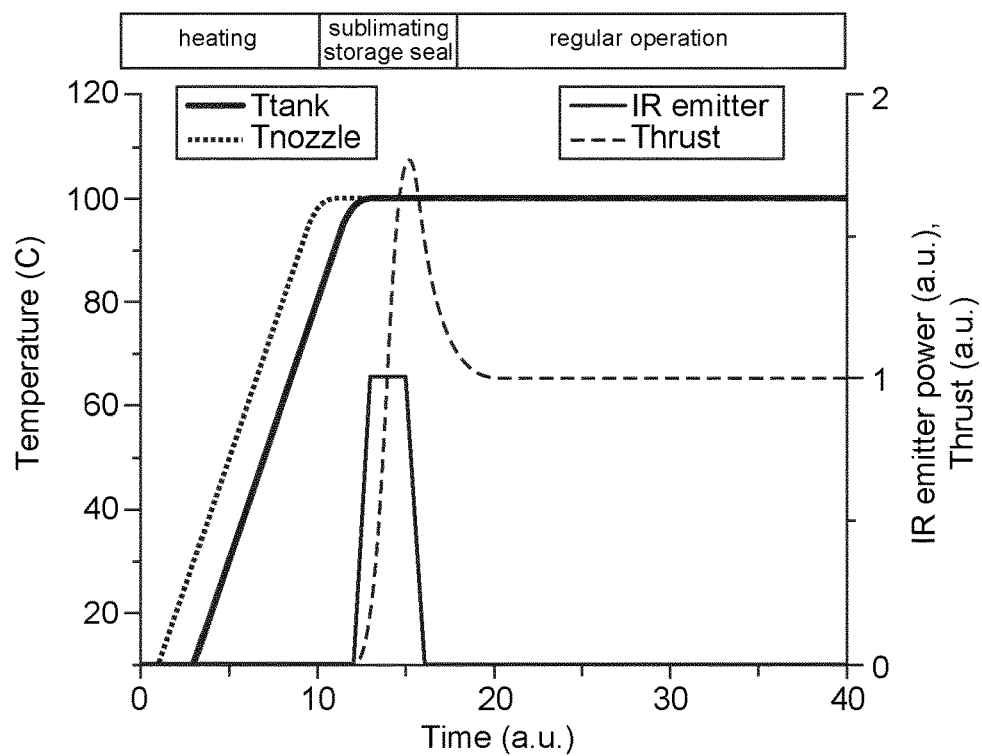
FIG. 7 is a schematic representation of an operational algorithm suitable for operating the cold gas thruster of the invention.

The cold gas thruster according to the invention can be operated according to an algorithm as presented on FIG. 7. The algorithm can be divided in three different phases. In the first heating phase, both tank 1 and nozzle 7 are heated until reaching programmed operational temperature, the storage sealing system 40 remaining undamaged. Phase 2 corresponds to the storage sealing system 40 sublimation phase, and during this phase power is supplied to the infrared emitter 16 for sublimating the protective film 17. In order to reduce power consumption, the tank and/or nozzle heaters 4,6 can be switched off during this second phase. The third phase is the operation phase, during which the infrared emitter 16 is not active and at least some of the tank and/or nozzle heaters 4,6, preferably all tank and/or nozzle heaters 4,6, are active. When phase 2 is to be implemented (first in orbit operation of the thruster), phase 2 is necessarily implemented after phase 1, and not before, so that an excessive positive pressure is developed in the tank 1. The positive pressure in the tank 1 force the remaining fragments of the protective film 17, if present, to move away from the nozzle 7 during phase 2. Otherwise, a risk exists that the nozzle 7 gets blocked by said remaining fragments of the protective film 17.

Process for Measuring the Amount of Remaining Propellant in the Tank

The thruster of the invention allows the implementation of processes for measuring the amount of remaining solid propellant in the tank 1 when the thruster is in operation.

Figure 8:
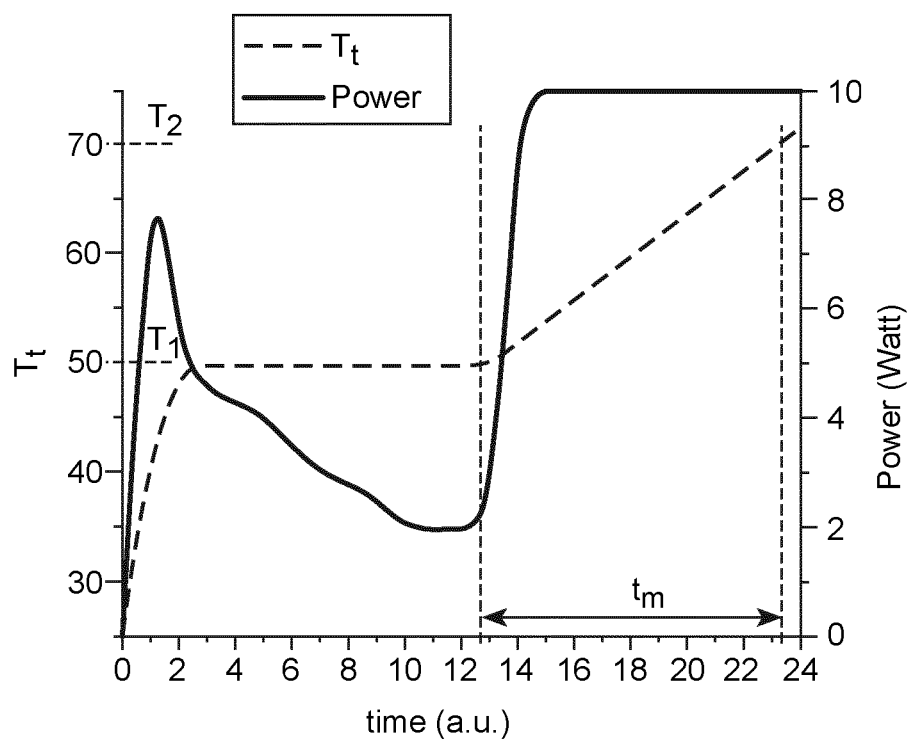
FIG. 8 is a graph describing an implementation of the measurement of the remaining amount of propellant in the tank from thermal properties of the tank.

Measuring the amount of remaining solid propellant in the tank 1 can be implemented from thermal properties of the tank 1. The method is based on change of the thermal capacity of the system depending on the propellant mass. The change of enthalpy $\Delta H$ during the heating from a temperature T1 to a temperature T2 with T2>T1 may be calculated according to the following formula: $\Delta H = \Sigma_{i=1}^{N} P_T/\Delta t_i$, wherein $P_T$ is instantaneous value of the power provided to the tank heaters 4, $\Delta t_i$ is current time interval, and N is the amount of measurement intervals. FIG. 8 is a graph describing an implementation of the measurement of the remaining amount of propellant in the tank 1 from thermal properties of the tank 1. First, the tank 1 is pre-heated to the temperature T1, and is maintained at this temperature for a relatively long time, needed for compensating thermal inertia of the system. Then the tank 1 is heated at constant or variable power to temperature T2 higher than T1, and the change of enthalpy $\Delta H$ during the heating from T1 to T2 is calculated according to the following formula: $\Delta H = \Sigma_{i=1}^{N} P_T/\Delta t_i$, wherein $P_T$ is instantaneous value of the power provided to the tank heaters 4, $\Delta t_i$ is current time interval, and N is the amount of measurement intervals. $t_m$ on FIG. 8 represents the total measurement time and is equal to $t_m = \Sigma_{i=1}^{N} \Delta t_i$.

In an embodiment, the process for measuring the amount of remaining propellant in the tank 1 comprises, after the tank has reached the temperature $T_2$, a step of measuring cooling curves of the tank 1, and assessing the variation of the heat transfer to the mechanical frame 3 and/or environment. The impact of the assessed variation of heat transfer to the mechanical frame 3 and/or environment onto the change of enthalpy can be obtained thanks to modelling. Alternatively, said impact can be obtained by referring to pre-established calibration tables obtained at different heat transfer rates.

Figure 9:
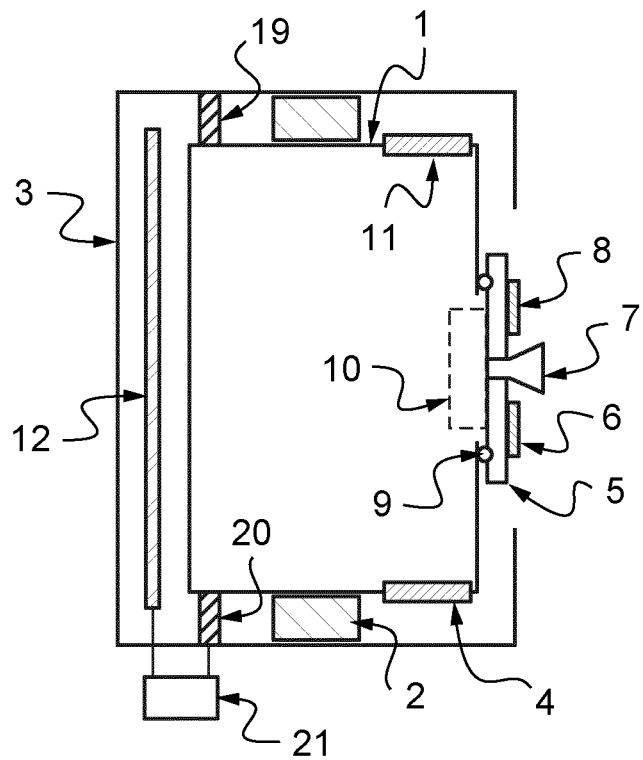
FIG. 9 is a schematic sectional view of a thruster according to the invention comprising a shock source, a displacement or acoustic sensor and a frequency filter for allowing measurement of the remaining amount of propellant in the tank.

Measuring the amount of remaining solid propellant in the tank 1 may be alternatively implemented from oscillatory properties of the tank. The thruster of FIG. 9 comprises a shock source or generator 19, a displacement or acoustic sensor (frequency sensor) 20 and a frequency filter 21 in order to implement the process for measuring the amount of propellant in the tank 1 according to the invention. Actually, at given mass, mechanical properties and geometry, the propellant tank 1 inside the propulsion system has natural oscillation frequencies, which correspond to the whole tank oscillation on fixations 2 and also to longitudinal and transversal acoustic waves, which all depend on the tank 1 mass and filling media. In order to measure the oscillation frequency, a shock is generated by a shock generator 19 positioned preferably at one end of the tank 1, and then measuring the frequency response by a frequency sensor 20, which is preferably positioned at the opposite end of the tank 1. The type of measured resonance is determined by the shock generator 19 properties and the frequency settings of the frequency filter 21, preferably the frequency band filter 21, which is preferably connected in series with the frequency sensor 20.

In the present description, the numerical ranges must be interpreted as being inclusive, unless otherwise specified, which means that the range limits are comprised in said range.

The invention claimed is:

1. A process for determining an amount of remaining propellant in a propellant tank of a cold gas thruster, comprising:
   (a') disposing a shock generator and a displacement or an acoustic sensor in contact with the propellant tank,
   (b') generating a shock with the shock generator,
   (c') measuring a frequency response with the displacement or the acoustic sensor,
   (d') comparing the measured frequency response with frequency values in a pre-established mass vs oscillation frequency response table, and
   (e') determining the amount of remaining propellant in the propellant tank.

\* \* \* \* \*